United States Patent

Madden et al.

[11] 4,026,257
[45] May 31, 1977

[54] APPARATUS FOR SUPPLYING FUEL TO A COMBUSTION ENGINE

[75] Inventors: Albert John Madden; Peter Lee Spedding, both of Auckland, New Zealand

[73] Assignee: Exhal Industries Limited, Auckland, New Zealand

[22] Filed: Sept. 25, 1975

[21] Appl. No.: 616,633

Related U.S. Application Data

[63] Continuation of Ser. No. 391,247, Aug. 24, 1973, abandoned.

[30] Foreign Application Priority Data

Aug. 24, 1972 New Zealand .................. 168201

[52] U.S. Cl. .................. 123/124 R; 123/119 R; 123/119 D; 123/141; 261/63; 261/78 R
[51] Int. Cl.² .................................. F02M 23/04
[58] Field of Search ............. 123/141, 119 R, 125, 123/126, 127, 124 R, 119 D; 261/78 R, 63

[56] References Cited

UNITED STATES PATENTS

| 1,086,287 | 2/1917 | Gehrmann | 261/63 |
| 1,427,910 | 9/1922 | Quinn | 261/78 R |
| 1,530,157 | 3/1925 | Edwards | 123/141 |
| 1,975,793 | 10/1934 | Kennedy | 261/63 |
| 2,720,196 | 10/1955 | Wolf | 123/141 |
| 2,833,261 | 5/1958 | August | 261/63 |
| 3,437,467 | 4/1969 | Jacobus | 123/141 |
| 3,564,580 | 2/1971 | Cinque | 123/119 D |
| 3,707,278 | 12/1972 | Landrum | 261/78 R |

FOREIGN PATENTS OR APPLICATIONS

| 969,851 | 5/1950 | France | 123/141 |

*Primary Examiner*—Wendell E. Burns

[57] ABSTRACT

A controlled constriction in the form of a venturi, for insertion into the inlet tract of an internal combustion engine to reduce pollutant emissions therefrom by improved vaporization of fuel droplets in the inlet tract without any substantial increase in the corresponding level of turbulence.

13 Claims, 3 Drawing Figures

APPARATUS FOR SUPPLYING FUEL TO A COMBUSTION ENGINE

This is a continuation of application Ser. No. 391,247 filed Aug. 24, 1973 now abandoned.

FIELD OF THE INVENTION

This invention relates to apparatus for supplying fuel to an internal combustion engine.

BACKGROUND OF THE INVENTION

With most internal combustion engines available today there is a disadvantage in that any liquid fuel droplets not vaporized in the primary fuel vaporization means of the engine, e.g. the carburetor or fuel injection nozzle, are either deposited on the walls of the inlet tract or carried into the combustion chamber in droplets form. If deposited on the walls of the inlet tract, this fuel is eventually vaporized on contact with the heated portion of the inlet tract which causes considerable enrichment of the mixture leading to incomplete combustion within the combustion chamber of the engine causing high pollutant discharge in the exhaust from the engine. If the droplets are carried into the combustion chamber, the interior portion of the droplet is not so readily burned as the exterior portion thereof so causing incomplete combustion within the combustion chamber of the engine and resultant high pollutant emissions. These disadvantages are particularly apparent during periods of de-acceleration or idling when high vacuums are experienced in the inlet manifold.

SUMMARY OF THE INVENTION

It is therefore an object of the present invention to provide apparatus for supplying fuel to an internal combustion engine which will obviate or minimize the foregoing disadvantages in a simple yet effective manner or which will at least provide the public with a useful choice.

Accordingly, one aspect the invention consists in apparatus for incorporation into the induction system of an internal combustion engine adapted to burn liquid fuel in a vapor form, which induction system includes a primary fuel vaporization means, and a fuel vapor inlet tract, said apparatus comprising a controlled constriction including converging and then diverging parts located in said fuel vapor inlet tract intermediate of said primary fuel vaporization means and the combustion chamber of said engine, the construction and arrangement being such that said controlled constriction acts to further vaporize any droplets of liquid fuel remaining in said vapour by the reduction of pressure therein but not to significantly increase the level of turbulence in said fuel vapor.

The invention consists in the foregoing, and also envisages constructions of which the following gives examples only, and where specific integers are mentioned herein which have known equivalents in the art to which this invention relates, such known equivalents are deemed to be incorporated herein as if individually set forth.

A BRIEF DESCRIPTION OF THE DRAWING

One preferred form of the invention will now be described with reference to the accompanying drawings in which, FIG. 1 is a plan view of a controlled constriction including converging and then diverging parts, with a valved air bleed suitable for insertion between the primary fuel vaporization means, e.g. a carburetor, and the inlet manifold of an internal combustion engine;

DESCRIPTION OF PREFERRED EMBODIMENTS

Figure 3:
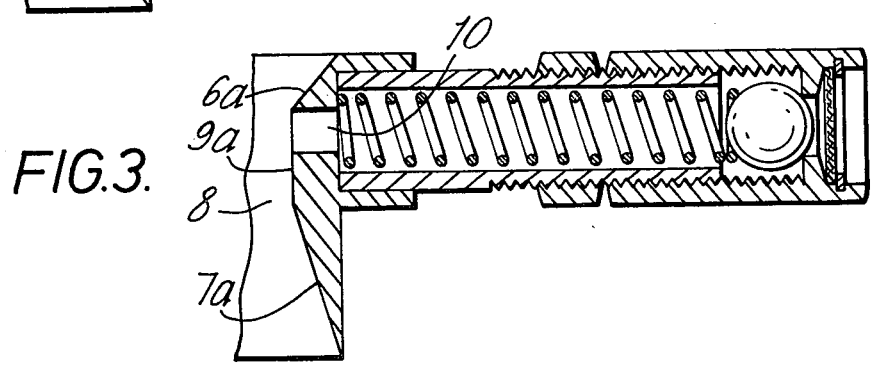
FIG. 3 is a cross sectional view similar to FIG. 2 showing an alternate form of lengthened constriction.

In one preferred form of the invention a controlled constriction including converging and then diverging parts, commonly known as a venturi, for use in the inlet tract of an internal combustion engine, e.g. between the carburetor and the inlet manifold, is constructed as follows:

A body 1 is provided in the form of a plate member having an aperture 2 of such a diameter that the opening 3 coincides with the outlet of the carburetor. Mounting holes or slots 4 are provided positioned so as to align with the carburetor to inlet manifold mounting bolts or studs and so enable the body 1 to be positioned between the carburetor and the inlet manifold. A tubular extension 5 extends from the body having external dimensions corresponding with the internal dimensions of the inlet tract of an inlet manifold (not shown) so that when the body is bolted between the carburetor and the inlet manifold, tubular extension 5 extends into said inlet tract. The interior surface of tubular extension 5 comprises an inlet portion 6 converging from the carburetor (not shown) and a diverging portion 7, forming a controlled constriction including converging and then diverging parts, or venturi 8 within the inlet tract. In an alternate form, a longer venturi is provided as shown in FIG. 3 comprising a converging portion 6a, a parallel throat portion 9a, and a diverging portion 7a.

Although the apparatus has been described for installation relative to a carburetor and an inlet manifold it is envisaged that the invention could be used with a multi-throat carburetor having one such venturi for each throat or with a multi-carburetor engine a venturi being inserted between each carburetor or carburetor throat and the corresponding inlet orifice to the combustion chamber. The apparatus could also be used in similar configurations with alternate forms of primary fuel vaporization means such as fuel injection in place of the carburetor or carburetors. More than one venturi could also be provided in each of said inlet tracts, for example, a first venturi could be provided adjacent to the outlet of the carburetor as described above and a secondary venturi provided adjacent the inlet value of each combustion chamber.

Adjacent to converging portion 6, in one preferred form, is provided an auxiliary air intake 10 comprising a tube 11 with which is associated an adjustable member 12, for example having a female thread threaded on a male thread on tube 11, and which is capable of being fixed in position by a lock nut 13. The adjustable member 12 has a partially closed end 14 in which a ball 15 seats on surfaces of the aperture 16 to form a ball valve, the ball being held in position by a spring 17 which abuts against a pin in tube 11 (not shown) or a flange 18 at the end of tube 11. An air filter 19 may be provided at the inlet 14 or the inlet may be connected to an existing air filter on the engine by means of a pipe or tube. There is of course a clear passageway from the valve seat 16 through the tubes 12 and 11 to the air intake 10 into aperture 2.

The foregoing describes a construction in which the apparatus forms a separate part from the carburetor or other primary fuel vaporization means. However, it is clearly possible that the apparatus may be integral either with the carburetor or with the end of the inlet manifold.

The use of operation is as follows:

When the internal combustion engine is running, the venturi 8 causes a reduction of pressure at the throat 9 by increasing the velocity of the fuel vapor at this point, so facilitating the vaporization of any droplets of fuel suspended in the vapor which have not been effectively vaporized by the primary fuel vaporization means such as a carburetor or injection nozzle. Also the venturi has been designed in such a manner e.g. by keeping the angle of diverging portion 7 or 7a small e.g. less than 20° and preferably less than 15° to the axis of the venturi, as to not significantly accentuate the level of turbulence in the inlet tract. It is thought that any increase in turbulence will be detrimental to the complete vaporization of all liquid fuel and this is demonstrated by test results to be described later.

The area of the venturi throat also affects the performance of the apparatus and when used in conjunction with a carburetor it has been found advantageous to use a venturi throat area not more than 20 percent larger or not less than 20 percent smaller than the throat area used in the carburetor venturi. A venturi throat area in excess of 20 percent smaller than that of the carburetor venturi restricts the flow of fuel vapour while not giving any additional benefit. Larger throats are mechanically difficult to achieve within an existing inlet tract and have little effect on the engine performance. It is believed that the optimum venturi throat area is substantially the same as that of the carburetor venturi.

In addition, when the engine is operating under conditions of high inlet manifold vacuum, i.e. when the throttle valve is closed or almost closed during phases of de-acceleration or idling, atmospheric pressure acting on the exposed end of ball 15 causes ball 15 to move away from aperture 16 against the force of spring 17 and so admit additional air through tubes 12 and 11 and inlet 10 into inlet tract 2. This air then mixes with fuel vapor from the carburetor said mixing being facilitated by the action of venturi 8 as previously described. In this manner, the effective air to fuel ratio of the combustion mixture is increased during the idling and de-acceleration phases which is beneficial in the reduction of exhaust pollutants from the engine as will be shown later. The degree of opening of the ball valve and the phase of engine operation, i.e. inlet vacuum, at which the ball valve opens may be adjusted by the movement of adjustable member 12 to vary the force exerted on ball 15 by spring 17.

The previously described apparatus has been tested in the engine of a 6 cylinder family saloon car in order to determine the effect of the apparatus on the exhaust pollutants of hydrocarbons, nitrogen oxides and carbon monoxide. The tests were conducted over the U.S. Federal Cycle (1970) which consists of

| Phase | Time Seconds | Driving Mode | Weighting Factor |
|---|---|---|---|
| 1 | 0-20 | Idle | .042 |
| 2 | 20-35 | Acceleration to 30 m.p.h. | .244 |
| 3 | 35-50 | Cruise 30 m.p.h. | .118 |
| 4 | 50-60 | Decelerate to 15 m.p.h. | .062 |
| 5 | 60-75 | Cruise at 15 m.p.h. | .050 |
| 6 | 75-105 | Accelerate to 50 m.p.h. | .455 |
| 7 | 105-138 | Decelerate to 20 m.p.h. | .029 |
| | | | 1.000 |

Hydrocarbons were tested by flame ionization (F.I.D) Nitrogen Oxides were tested by Kitagawa Indicator tubes. Carbon monoxide was tested by non-dispenser infra red (N.D.I.R.) using a Mexa 200 analyser. This machine is approved by the U.S. Standards.

A total of seven such series of tests were conducted on the following configurations.

A. A standard 6 cylinder family saloon car having done 4000 miles.

B. As for A using apparatus according to the invention with the long venturi configuration as shown in FIG. 3.

Figure 1:
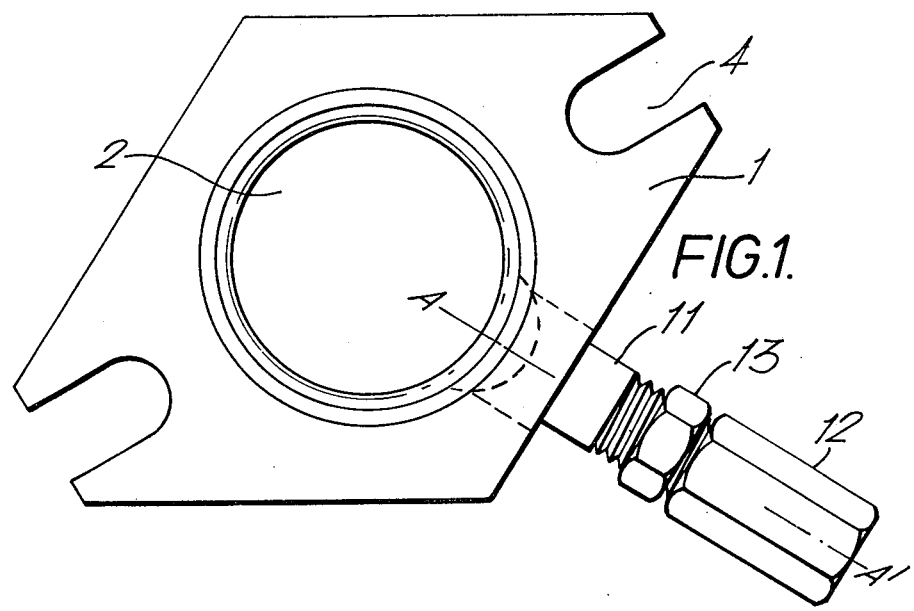
Figure 2:
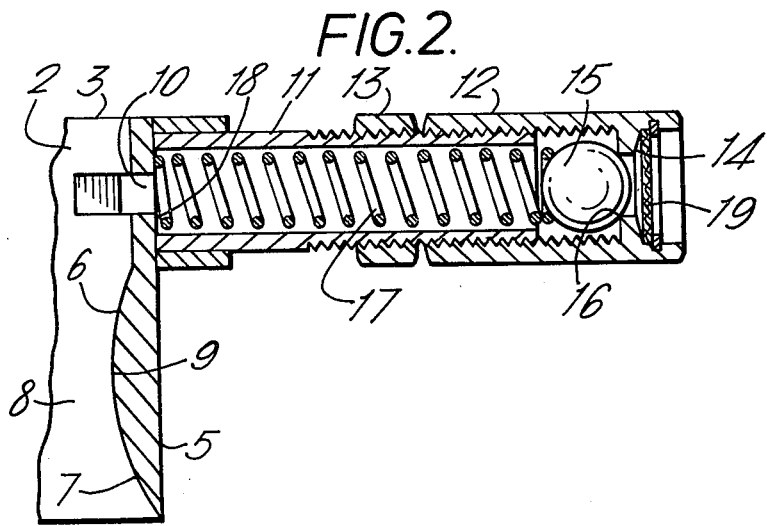
FIG. 2 is an enlarged cross sectional view along the line A—A' of FIG. 1.

C. As for A with apparatus according to the invention using the short venturi configuration as shown in FIG. 2.

D. As for C but with more air allowed through the air bleed tube (less spring pressure).

E. As for C but with no air bleed.

F. As for A with auxiliary air bleed but with no venturi.

G. As for A with a venturi and a continuous air bleed adapted to induce a cyclonic motion in the inlet tract and so demonstrate the effect of induced turbulence.

Power tests were also done at 30 m.p.h and 60 m.p.h on engine configurations involving
1. the standard car
2. apparatus according to the invention with the long venturi
3. apparatus according to the invention with a short venturi
4. a venturi with continuous air bleed and cyclonic motion.

As a result of the tests taken over the full cycle using the U.S. Federal Weighting factors as shown, the standard car gave off 1100 parts per million (ppm) of hydrocarbons, 347.5 ppm of nitrogen oxides and 2.999 percent of carbon monoxide. Comparative emission figures for the other configurations and values of the percentage decrease in emissions given in Table 2, below.

Referring to the results contained in table 2, it will be noted that the percentage decrease in pollutants obtained in apparatus according to the invention as in configurations B, C and D are generally superior to results using other configurations. In particular the invention shows a marked decrease in pollutant emissions compared with results obtained with configuration G using a venturi with induced turbulence which supports our claim to reduce emissions by a more complete vaporization of the fuel air mixture while yet tending to not significantly accentuate the level of turbulence. The beneficial effect of the differential pressure drop through the venturi is also demonstrated in the lower hydrocarbon emissions obtained from a long venturi which maintains the pressure drop on any given element of fuel for a longer period of time.

For example, in the preferred embodiment of the invention i.e. configurations B and C, hydrocarbon emissions are reduced from 1100 ppm in the standard car to 843 and 790 ppm respectively i.e. decreases of 77 and 72 percent. In comparison configuration G using induced turbulence in the form of a cyclonic air bleed achieves a hydrocarbon decrease of only 52 percent, demonstrating that the suppression of turbulence is important to the effectiveness of the invention. Similarly, configurations B and C reduce nitrogen oxide emissions by 90 and 94 percent up compared with an 82 percent reduction using configuration G, and configurations B and C reduce carbon monoxide emissions by 88 percent compared with a 72 percent carbon monoxide emission reduction by configuration G. Similar comparisons can obviously be made between configurations B and C and configuration F having an air bleed with no venturi. It can therefore be seen that the apparatus according to the invention gives a far greater benefit in reduction of exhaust emissions by the use of a venturi designed to minimize turbulence than other forms of similar apparatus which do not embody this feature.

The angle of diffusion of the venturi is obviously important in the suppression of turbulence and it is felt that diffusion angles of greater than 20° will result in induced turbulence and resultant loss of pressure regain in the diffusor section. For optimum results it is in fact desirable to provide a diffusion angle of 15° or less. Greater diffusion angles will tend not only to increase pollutant emissions as evidenced by test results from configuration G but also to induce drag and energy loss in the induction system causing a power loss in the engine. This is further evidenced by the results shown in Table 3, being a comparison of power tests done at 30 mph and 60 mph. These results show that induced turbulence as in the cyclonic venturi results in a significant power loss at higher speeds.

It is also evident from Table 3 that the apparatus according to the invention has little effect on the power of the engine either in long or short venturi form. For example, the invention with a short venturi gives a slight power decrease over a standard car whereas the long venturi configuration actually appears to increase the power output. The venturi with induced turbulence, i.e. configuration G gives a noted power drop at high speeds, (from 57 BHP in the standard car to 50 BHP) and this is believed to be due to the loss of pressure regain due to turbulence at the venturi. It should be noted that increments of one horsepower have little significance in this type of test.

The attached Tables 1, 2 and 3 give some test results.

TABLE 1

| Phase/ Configuration | Results H/C (ppm) | N/O (ppm) | CO (%) | After Applying Weighting Factor H/C (ppm) | N/O (ppm) | CO (%) | Configuration |
|---|---|---|---|---|---|---|---|
| 1A | 1800 | 10 | 4.5 | 75.60 | 0.42 | 0.189 | Standard car under normal running conditions |
| 2A | 1270 | 500 | 4.8 | 309.88 | 122.00 | 1.171 | |
| 3A | 720 | 1000 | 2.0 | 84.96 | 118.00 | 0.236 | |
| 4A | 950 | 350 | 2.6 | 58.90 | 21.70 | 0.161 | |
| 5A | 1170 | 450 | 5.6 | 58.50 | 22.50 | 0.280 | |
| 6A | 1085 | 100 | 2.0 | 493.68 | 45.50 | 0.910 | |
| 7A | 650 | 600 | 1.8 | 18.85 | 17.40 | 0.052 | |
| 1B | 240 | 5 | 0.05 | 10.08 | 0.21 | 0.002 | Engine with apparatus according to the invention. Long venturi |
| 2B | 240 | 75 | 0.6 | 58.56 | 18.30 | 0.146 | |
| 3B | 260 | 75 | 0.05 | 30.68 | 8.85 | 0.006 | |
| 4B | 200 | 30 | 0.20 | 12.40 | 1.86 | 0.012 | |
| 5B | 210 | 30 | 1.70 | 10.50 | 1.50 | 0.085 | |
| 6B | 280 | 10 | 0.25 | 127.40 | 4.55 | 0.113 | |
| 7B | 280 | 50 | 0.30 | 8.12 | 1.45 | 0.009 | |
| 1C | 200 | 5 | 0.01 | 8.40 | 0.21 | 0.000 | Engine with apparatus according to the invention - short venturi |
| 2C | 340 | 20 | 0.65 | 82.96 | 4.88 | 0.159 | |
| 3C | 260 | 50 | 0.2 | 30.68 | 5.9 | 0.024 | |
| 4C | 280 | 50 | 0.2 | 17.36 | 3.10 | 0.012 | |
| 5C | 180 | 30 | 1.0 | 9.00 | 1.50 | 0.050 | |
| 6C | 340 | 10 | 0.20 | 154.70 | 4.55 | 0.100 | |
| 7C | 260 | 50 | 0.3 | 7.54 | 1.45 | 0.009 | |
| 1D | 400 | 10 | 0.01 | 16.80 | 0.42 | 0.000 | As for C but with more air through air bleed. |
| 2D | 400 | 100 | 0.35 | 97.60 | 24.40 | 0.085 | |
| 3D | 400 | 100 | 0.18 | 47.20 | 11.80 | 0.021 | |
| 4D | 280 | 75 | 0.15 | 17.36 | 4.65 | 0.009 | |
| 5D | 360 | 100 | 0.40 | 18.00 | 5.00 | 0.020 | |
| 6D | 380 | 20 | 0.10 | 172.90 | 9.10 | 0.046 | |
| 7D | 125 | 75 | 0.0 | 3.63 | 2.18 | 0.000 | |
| 1E | 180 | 7.5 | 0.9 | 7.56 | 0.32 | 0.038 | As for C with air bleed turned off |
| 2E | 420 | 10 | 0.8 | 102.48 | 2.44 | 0.195 | |
| 3E | 330 | 250 | 0.45 | 38.94 | 29.50 | 0.053 | |
| 4E | 400 | 100 | 0.85 | 27.80 | 6.20 | 0.053 | |
| 5E | 660 | 50 | 3.6 | 33.00 | 2.50 | 0.180 | |
| 6E | 400 | 100 | 0.8 | 182.00 | 45.50 | 0.364 | |
| 7E | 340 | 200 | 0.8 | 9.86 | 5.80 | 0.023 | |
| 1F | 340 | 20 | 0.1 | 14.28 | 0.84 | 0.004 | As for C with air bleed but no venturi |
| 2F | 420 | 100 | 0.7 | 102.48 | 24.40 | 0.171 | |
| 3F | 360 | 100 | 0.25 | 42.48 | 11.80 | 0.030 | |
| 4F | 360 | 200 | 0.4 | 22.32 | 12.40 | 0.025 | |
| 5F | 340 | 50 | 0.9 | 17.00 | 2.50 | 0.045 | |
| 6F | 650 | 50 | 0.85 | 295.75 | 22.75 | 0.387 | |
| 7F | 440 | 100 | 0.5 | 12.76 | 2.90 | 0.015 | |
| 1G | 190 | 10 | 0.1 | 7.98 | 0.42 | 0.004 | Engine with a venturi |

TABLE 1-continued

| Phase/ Configuration | Results H/C (ppm) | Results N/O (ppm) | Results CO (%) | After Applying Weighting Factor H/C (ppm) | After Applying Weighting Factor N/O (ppm) | After Applying Weighting Factor CO (%) | Configuration |
|---|---|---|---|---|---|---|---|
| 2G | 480 | 30 | 0.75 | 117.12 | 7.32 | 0.183 | as described using a continuous cyclonic air bleed. |
| 3G | 380 | 200 | 0.4 | 44.84 | 23.60 | 0.048 | |
| 4G | 400 | 75 | 1.0 | 27.80 | 4.65 | 0.062 | |
| 5G | 640 | 50 | 2.4 | 32.00 | 2.50 | 0.120 | |
| 6G | 540 | 50 | 0.9 | 291.20 | 22.75 | 0.410 | |
| 7G | 340 | 100 | 0.9 | 9.86 | 2.90 | 0.026 | |

TABLE 2

Comparison of the Test Results (U.S. Driving Cycle)

| CONFIGURATION | H/C | N/O | CO |
|---|---|---|---|
| A. Standard car with 4000 miles on the odometer | ppm | ppm | % |
| Total | 1100 | 347.5 | 2.999 |
| B. As for A with apparatus according to the invention - Long Venturi | | | |
| Total | 257 | 36.7 | 0.373 |
| Pollution decrease | 843 | 310.8 | 2.626 |
| % Decrease | 77 | 90 | 88 |
| C. As for A with apparatus according to the invention - short Venturi | | | |
| Total | 310 | 21.6 | 0.354 |
| Pollution decrease | 790 | 323.9 | 2.645 |
| % Decrease | 72 | 94 | 88 |
| D. As for C but with more air through air Bleed tube(less spring pressure) | | | |
| Total | 373 | 575 | 0.181 |
| Pollution decrease | 727 | 290.0 | 2.818 |
| % Decrease | 66 | 83 | 94 |
| E. As for C but with Air Bleed turned off | | | |
| Total | 399 | 92.3 | 0.906 |
| Pollution decrease | 701 | 255.2 | 2.093 |
| % Decrease | 64 | 73 | 70 |
| F. As for A with Air bleed but no venturi | | | |
| Total | 507 | 77.6 | 0.677 |
| Pollution decrease | 593 | 269.9 | 2.322 |
| % Decrease | 54 | 78 | 77 |
| G. As for A with Unit using Continuous cyclonic Air Bleed | | | |
| Total | 52.8 | 64.1 | 0.853 |
| Pollution decrease | 572 | 283.4 | 2.146 |
| Decrease | 52 | 82 | 72 |

TABLE 3

Comparison of Power Tests

| Situation | Power Test B.H.P. Power at 30 m.p.h. | Power Test B.H.P. at 60 m.p.h. |
|---|---|---|
| Standard car | 33 | 57 |
| Plus invention with Long Venturi | 35 | 58 |
| Plus invention with Short Venturi | 32 | 55 |
| Plus cyclonic Venturi | 33 | 50 |

We claim:

1. Apparatus for incorporation into the induction system of an internal combustion engine adapted to burn liquid fuel in a vapor form, which induction system includes a primary fuel vaporization means and a fuel vapor inlet tract having walls and an axis, said apparatus comprising a body inserted into said fuel vapor inlet tract intermediate of said primary fuel vaporization means and the combustion chamber of said engine, said body comprising a first portion defining a first aperture converging in the direction of fuel vapor flow and a second portion defining a second aperture having an inlet substantially coindent with the outlet of said first aperture, said second aperture diverging in the direction of fuel vapor flow, the inlet to said first aperture and the outlet from said second aperture being arranged to substantially conform with the walls of said fuel vapor inlet tract at their points of juncture, said members defining said first aperture subtending an angle of not greater than 45° with the axis of said inlet tract at the inlet to said first aperture and said members defining said second aperture subtending an angle of not greater than 20° with the axis of said inlet tract at the outlet from said second aperture so as to not significantly increase the level of turbulence in the fuel vapor passing through said fuel vapor inlet tract.

2. Apparatus as claimed in claim 1 wherein said members defining said second aperture subtending an angle not greater than 15°.

3. Apparatus as claimed in claim 1 when used in conjunction with a primary fuel vaporization means comprising a carburetor of a known type containing therein a carburetor venturi.

4. Apparatus as claimed in claim 3 wherein the area defined by said members defining said first aperture at the outlet thereof is not greater than 20 percent larger and not greater than 20 percent smaller than the throat area of said carburetor venturi.

5. Apparatus as claimed in claim 3 wherein the area defined by said members defining said aperture at the outlet thereof is substantially equal to the throat area of said carburetor venturi.

6. Apparatus as claimed in claim 1 wherein an auxiliary air inlet is provided in said fuel vapor inlet tract.

7. Apparatus as claimed in claim 6 wherein said auxiliary air inlet comprises a pressure operated valve means adapted to admit additional air to said fuel vapor inlet tract when the pressure in said fuel vapor inlet tract is reduced to a substantially predetermined pressure.

8. Apparatus as claimed in claim 6 wherein said auxiliary air inlet is positioned adjacent to said first aperture.

9. Apparatus as claimed in claim 7 wherein said pressure operated valve means comprises a tube within which is mounted a spring loaded ball valve.

10. Apparatus as claimed in claim 1 wherein said body is formed integral with said inlet tract or said primary fuel vaporization means.

11. Apparatus as claimed in claim 1 wherein said inlet tract is an inlet manifold of a multi cylinder internal combustion engine.

12. An internal combustion engine having mounted between the primary fuel vaporization means thereof and a part of the inlet tract thereof apparatus according to claim 1.

13. An internal combustion engine as claimed in claim 12 wherein said primary fuel vaporization means comprises a carburetor including a butterfly control valve, said butterfly control valve means mounted between the venturi of the carburetor and said body.

* * * * *